INVENTOR

Peter T. Shanahan

United States Patent Office 2,921,416
Patented Jan. 19, 1960

2,921,416

LAWN MOWER SHARPENER

Peter T. Shanahan, Jamaica, N.Y.

Application August 14, 1958, Serial No. 755,057

1 Claim. (Cl. 51—173)

This invention relates to tools and more particularly to a tool for sharpening lawn mowers.

It is an object of the present invention to provide a sharpening fixture for grinding rotary lawn mower blades in a simple and efficient manner.

Another object of the present invention is to provide a lawn mower sharpening fixture of the above type which can be attached to any power unit for grinding wheels for accurately and properly sharpening rotary lawn mower blades with a minimum amount of skill and without the use of additional equipment.

Other objects of the invention are to provide a rotary blade lawn mower sharpening fixture bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figure 1:
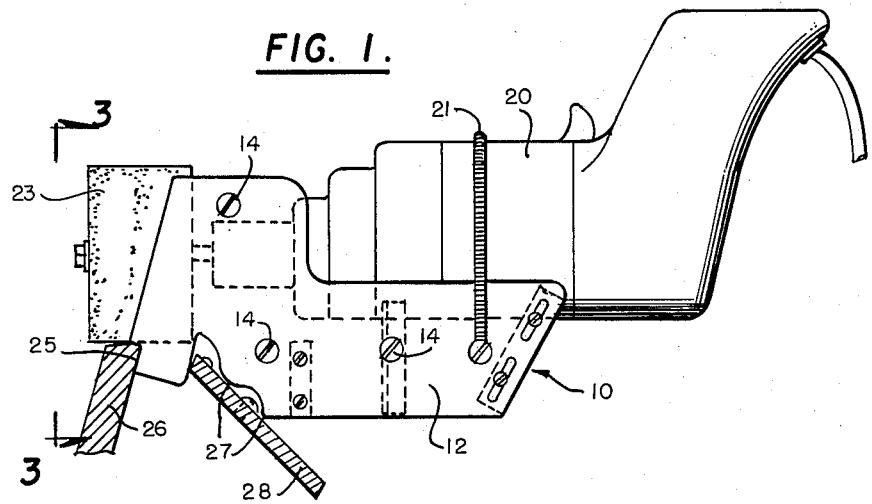
Figure 1 is a side elevational view of a sharpening fixture made in accordance with the present invention in operative use.
Figure 2:
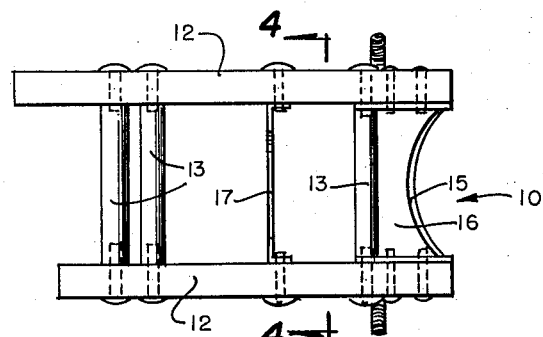
Figure 2 is a top plan view of the sharpening fixture shown in Figure 1, with the power drill removed therefrom.
Figure 3:
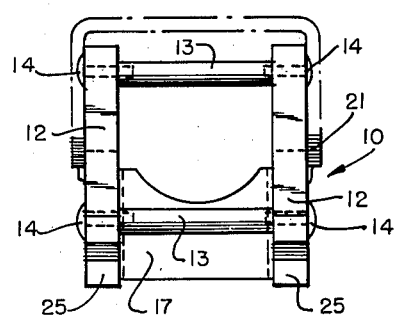
Figure 3 is an end elevational view taken along line 3—3 of Figure 1.
Figure 4:
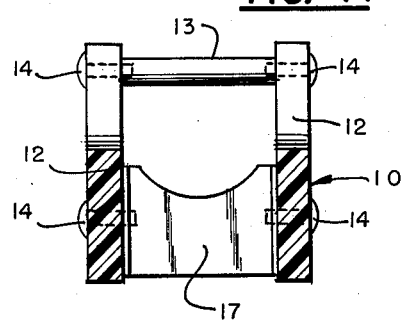
Figure 4 is a transverse cross sectional view taken along line 4—4 of Figure 2.

Referring now more in detail to the drawing, a lawn mower sharpening tool 10 made in accordance with the present invention is shown to include a pair of substantially identical side plates 12 which are secured in spaced apart parallel relationship by means of rod-like spacers 13 and machine screws 14. An angle plate 16 having an upwardly concave cut out 15 is secured between the side plates 12 adjacent to the rear end thereof. A similar plate 17 is also secured to the side plates 12 intermediate the ends thereof. The angle plate 16 and center plate 17 thus provides a cradle-like support for a power hand unit 20 for driving grinding wheels that may be releasably secured within the fixture by means of an elongated tension spring 21 secured at opposite ends to the side plates 12 and thus yieldably positioning the power unit in place, as is shown in Figure 1. A grinding wheel 23 is secured to a shank that is clamped within the chuck of the power unit 20, so that wheel 23 is thus positioned adjacent to the front end of the side plates 12. Each front end of the side plates 12 is provided with a cut out 25 that forms a positioning means for directing the blade 26 of the lawn mower being sharpened into contact with the grinding wheel 23 at the proper angle.

Protuberances 27 on each of the side plates 12 intermediate the ends thereof all lie in a plane that defines an acute angle with the surface of the cut out 25 for slidably directing the fixture longitudinally along the length of the mower blade being sharpened by slidably engaging the bed plate or stationary cutter blade 28 of the mower.

The operation of the fixture will now be readily understood. With the power hand unit 20 properly secured in place upon the fixture by the spring 21, and with the surface of the grinding wheel 23 immediately adjacent to the cut outs 25, the protuberances 27 will slidably engage the bed plate 28 of the mower with a blade 26 slidably received within the cut out 25 in frictional contact with the grind wheel 23. With the power unit energized, it is thus possible to move the fixture along the bed plate 28 so that the grinding wheel 23 will sharpen the cutting edge of the blade 26 at the proper angle throughout the entire length thereof. The grinding operation is repeated for each blade of the reel of the mower so that the entire mower can be quickly and easily sharpened in a simple and efficient manner.

While various changes may be made in the detail construction, it shall be understood that such changes shall be within the spirit and scope of the present invention as defined by the appended claim.

What I claim as new and desire to protect by Letters Patent of the United States is:

A rotary lawn mower blade sharpening fixture comprising a pair of side plates, transversely-extending spacers securing together said side plates in spaced apart parallel relationship, a transverse plate having an upwardly concave cut out secured between the side plates adjacent to the rear end thereof, a similar cut out transverse plate secured between the side plates intermediate the ends thereof, the cut outs of the transverse plates serving to receive a hand power grinding wheel unit with the grinding wheel extending within the forward ends of the side plates, a tension retaining spring connected between said plates for holding the power unit in the cut outs of the transverse plates the forward ends of said side plates being cut out to provide positioning means for directing the blade of the lawn mower being sharpened into contact with the grinding wheel, said side plates having protuberances in rear of the positioning means defining an acute angle therewith for slidably directing the fixture along the length of the mower stationary cutter blade.

References Cited in the file of this patent

UNITED STATES PATENTS

| | | |
|---|---|---|
| 2,586,236 | Lewis | Feb. 19, 1952 |
| 2,613,483 | Lewis | Oct. 14, 1952 |
| 2,863,262 | Turner | Dec. 9, 1958 |